United States Patent [19]
Adell

[11] Patent Number: 4,604,832
[45] Date of Patent: Aug. 12, 1986

[54] EDGE GUARD

[75] Inventor: Robert Adell, Sunnyvale, Tex.

[73] Assignee: U.S. Product Development Company, Sunnyvale, Tex.

[21] Appl. No.: 784,920

[22] Filed: Oct. 4, 1985

Related U.S. Application Data

[63] Continuation of Ser. No. 617,766, Jun. 6, 1984, Pat. No. 4,565,032.

[51] Int. Cl.⁴ .............................................. B60J 5/00
[52] U.S. Cl. ...................................... 49/462; 52/716; 428/31; 428/122
[58] Field of Search .................................. 49/462, 460; 52/716–718; 428/31, 122, 358

[56] References Cited

U.S. PATENT DOCUMENTS

| 4,220,681 | 9/1980 | Narita | 52/716 X |
| 4,259,812 | 4/1981 | Adell | 49/462 |
| 4,334,700 | 6/1982 | Adell | 49/462 X |
| 4,365,450 | 12/1982 | Adell | 49/462 X |
| 4,379,377 | 4/1983 | Adell | 49/462 |
| 4,387,125 | 6/1983 | Adell | 49/462 X |

Primary Examiner—Philip C. Kannan
Attorney, Agent, or Firm—Stephenson & Boller

[57] ABSTRACT

An insulated metal edge guard particularly adapted for fitting onto the trailing edge of a swinging closure which closes against an adjacent panel. The edge guard comprises a U-shaped metal channel having beads at the distal ends of the legs of the channel wherein the beads comprise double reversal folds folded back against the legs. Insulating material is selectively applied to the metal strip by an extrusion, or co-extrusion, procedure prior to the strip being formed into the channel-shaped cross section. Various embodiments of edge guard are disclosed.

12 Claims, 30 Drawing Figures

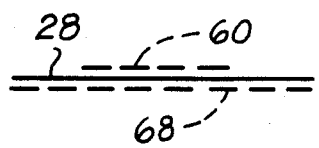
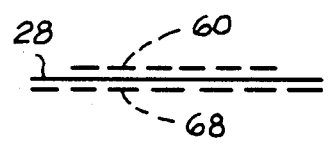
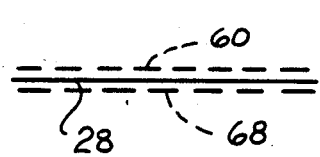
FIG. 12A    FIG. 13A    FIG. 14A
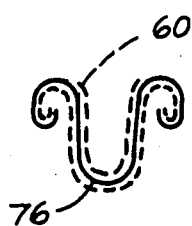
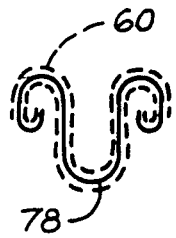
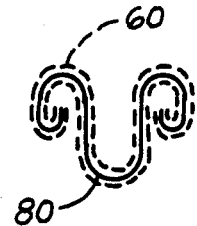
FIG. 12    FIG. 13    FIG. 14
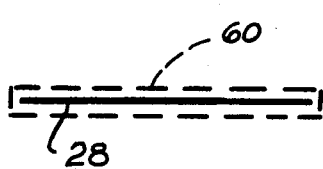
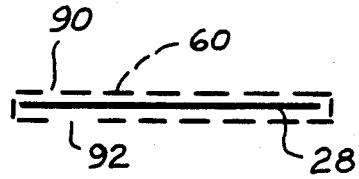
FIG. 15A    FIG. 16A
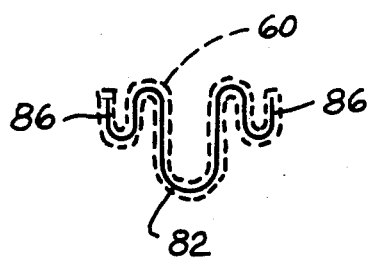
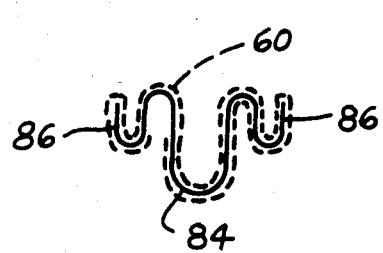
FIG. 15    FIG. 16

4,604,832

EDGE GUARD

REFERENCE TO A RELATED APPLICATION

This application is a continuation of Ser. No. 617,766 filed June 6, 1984 now Pat. No. 4,565,032.

BACKGROUND AND SUMMARY OF THE INVENTION

This invention relates to an edge guard of the type which is commonly applied to the trailing edge of a swinging closure in an automotive vehicle. The disclosed embodiment is of a door edge guard which is installed on the trailing edge of a vehicle door.

Edge guards perform decorative and protective functions. Applicant has originated and developed insulated metal edge guards wherein the edge guards embody self-retention characteristics of a metal U-shaped channel with the protective features provided by a layer of insulation on the interior of the channel.

Edge guards of the type applied to the trailing edges of swinging closures, particularly in the case of door edge guards, must be designed to fit the automobile manufacturers' door designs since the automobile manufacturers themselves control the design of the doors.

Extensive body panel fit improvement programs conducted by automobile manufacturers have reduced the thicknesses of the gaps between the trailing edges of swinging closures and adjacent body panels. For example, in the case of a two-door vehicle, the gap between the trailing edge of each door and the adjacent quarter panel has been significantly reduced as a part of this program.

In fact, one automobile manufacturer so designed its door fit that it was impossible to provide edge guards as an original factory equipment option. This deprived the consumer of the availability of the decorative and protective function of door edge guards, and it also resulted in a lost opportunity for profit on the part of the automobile dealers and manufacturers. If a customer desired a door edge guard it was necessary for the dealer to readjust the doors before the edge guards could be installed. This imposed a significant additional cost on the customer which could have been avoided if the edge guards could have been installed at the factory as an original equipment option without door adjustment.

The present invention is directed to a new and improved edge guard for the trailing edge of a swinging closure which provides the protective and decorative functions of an insulated edge guard having a self-retaining metal channel, yet which is compatible with the reduced thickness gaps which are designed into the automobiles by the manufacturers, whereby an edge guard embodying principles of the invention can be installed as an original equipment option at the factory, if desired.

The present invention relates to an improvement in an edge guard which renders the edge guard suitable for use with automobiles having reduced thickness gaps between the trailing edges of its swinging closures and adjacent portions of the vehicle body. Moreover, the invention provides a construction which is efficient in its use of materials, yet provides for a number of possible configurations depending upon the specific design deemed most appropriate for any particular vehicle.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIGS. 3-16 respective views similar to FIG. 2, but of a somewhat schematic nature, illustrating various embodiments of edge guards according to the present invention.

FIGS. 3A-16A are views each of which is correlated with a corresponding one of FIGS. 3-16 to illustrate in a schematic way a step in the method of manufacturing the corresponding edge guard.

DESCRIPTION OF THE PREFERRED EMBODIMENT

Figure 1:
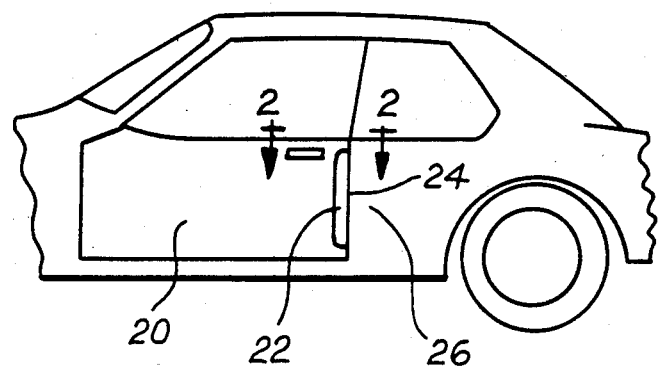
FIG. 1 is a partial side elevational view of an automobile showing a door having an edge guard embodying principles of the invention installed on its trailing edge.
Figure 2:
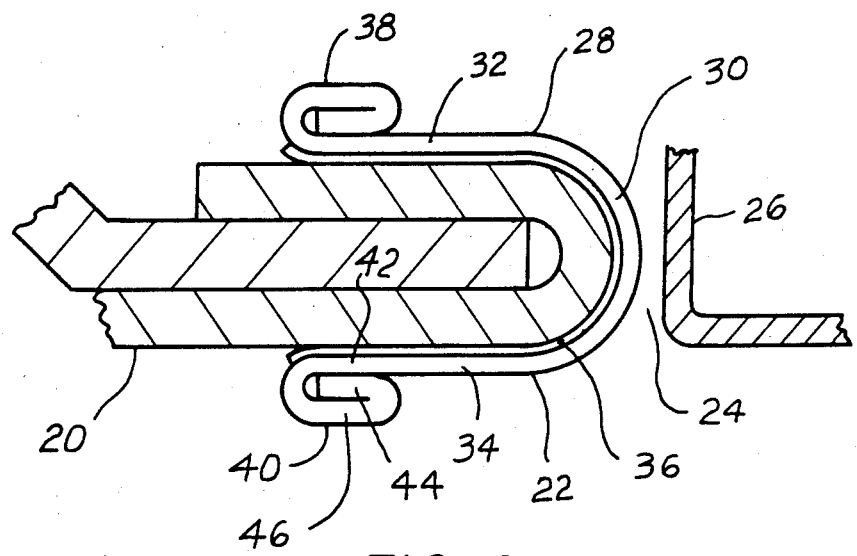
FIG. 2 is a cross sectional view on an enlarged scale taken in the direction of arrows 2—2 in FIG. 1 and illustrating a first embodiment of edge guard according to the present invention.

FIGS. 1 and 2 illustrate a door 20 containing a first embodident of edge guard 22 installed on its trailing edge. When the door is in the closed position, a gap 24 separates the trailing edge of the door from the forward edge of an adjacent vehicle body panel 26. In the case of a two-door vehicle, the body panel 26 would be the vehicle quarter panel. Depending upon the styling of the vehicle, the edge guard may be other than straight, generally conforming to a contour or sweep corresponding to that of the trailing edge of the door. The length of the edge guard may be less than or equal to the length of the trailing edge. The vehicle body fit improvement programs referred to earlier have resulted in a reduced thickness for gap 24, and this gap is typically held to very close tolerances. The present invention provides a door edge guard which can be used with these close gap tolerances.

Edge guard 22 is formed from a metal strip 28 into a generally U-shaped cross section comprising a curved base portion 30, an inner leg 32 and an outer leg 34 with the two legs extending from the curved base portion 30. The metal strip may be of any suitable material of the type commonly used for edge guard manufacture, for example stainless steel. The edge guard comprises an exterior which is exposed for view and an interior which confronts the trailing edge of door 20 in the manner shown. Although reference is made to the illustrated edge guard as having a generally U-shaped cross section, it will be appreciated that principles of the invention may be applied to other shapes such as J, V; moreover, it is not necessary that the legs be parallel, straight, or that the edge guard be symmetrical.

Edge guard 22 also comprises a layer of protective insulation 36 on the interior of the metal channel. As can be seen in FIG. 2, the entire interior of the metal channel fitting onto the door edge is covered by insulation 36. This provides protection and other important features as explained in many of applicant's issued patents and pending applications. The insulating layer extends from base portion 30 along legs 32, 34 to their distal ends, preferably far enough so that during installation of the edge guard onto the door edge, the insulating material is always disposed between the metal of the U-shaped channel and the door edge. However, as can be seen from FIG. 2, the construction of the edge guard is such that the metal is uncovered on the exterior so as to present a metallic appearance for view.

Edge guard 22 is further provided with beads 38, 40 respectively at the distal ends of its legs. Each bead 38, 40 is formed as a double thickness fold folded back onto the corresponding leg. The construction of the edge guard is such that the distal ends of the legs are force-applying points and therefore the triple metal thickness provided by the three thicknesses 42, 44, and 46 strengthens the edge guard for self-retention force-applying purposes. Yet the edge guard is compatible for the reduced thickness gap 24.

With the edge guard fitted fully onto the door edge in the manner shown in FIG. 2, the base of the edge guard clears body panel 26 when door 20 is closed. In other words, the combined thicknesses of insulating layer 36 and of metal strip 28 at base 30 are less than the thickness of gap 24 which exists when the edge guard is not installed. Therefore, the edge guard is seen to fit onto the trailing edge of a swinging closure in a vehicle having a close tolerance gap between the trailing edge and an adjacent panel while it retains the beneficial self-retention, insulation, and protective characteristics of prior insulated edge guards.

Although FIG. 2 illustrates the edge guard as fitting with conformity onto the trailing edge such that insulating liner 36 is in full surface-to-surface contact with the trailing edge of the door, it will be appreciated that in actual practice this condition may not always ensue. There may exist a certain gap or space between the edge guard and the door edge; however, a self-retention principle wherein the resiliency of the metal channel serves to exert a self-retention force via the distal ends of the legs is still maintained. It can therefore be appreciated that depending upon the design of the particular vehicle, cross sectional shapes other than the illustrated one may be used and yet still embody principles of the invention.

The remaining drawing FIGS. 3-16 and 3A-16A illustrate various specific embodiments of edge guards and steps in their manufacture. The preferred fabrication technique for making any of the edge guards is to extrude non-metallic material, i.e. plastic such as vinyl, onto the metal strip in the flat. (FIGS. identified by the suffix "A") The extrusion may be on one side of the strip, both sides, and/or the longitudinal side edges. Thus, the invention contemplates both single-sided and double-sided extruded, or co-extruded, laminates. The covering is selectively performed and may be either full or partial.

The extrusion, or co-extrusion, procedure is especially advantageous because it is possible to provide very precise control of the thickness of the plastic material as well as its location. It is also possible to use known laser technology to provide precise control assuring the proper amount of plastic as far as size, gauge, and location and in both single and double-sided laminates.

After the extrusion or co-extrusion of the plastic onto the metal strip in the flat, the laminate may be formed by conventional procedures into the desired crosssectional shapes. The preferred procedure is by use of roll-forming techniques. By the multiple folding to form a multi-dutch bend or a multi-bead at the distal end of each leg, in conjunction with the characteristics of the particular metal selected for the strip, the resulting edge guard may be endowed with the desired attributes of strength and resilience, but while retaining a minimum thickness at the base of the edge guard so as to accommodate the thickness of the gap between the trailing edge of the swinging closure and the adjacent body panel. Consequently, the invention yields a product which can be used with gaps having very close tolerances and heretofore unable to use factory installed, or dealer installed edge guards without the necessity of a costly adjustment of the door.

In FIGS. 3-16 and 3A-16A, the broken lines represent insulation and the solid line represents metal.

Figure 3A:
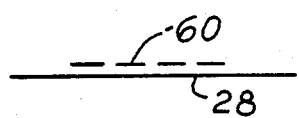
Figure 4A:
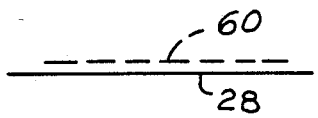
Figure 5A:
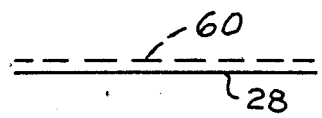
Figure 3:
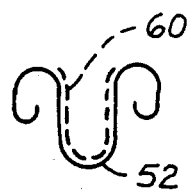
Figure 4:
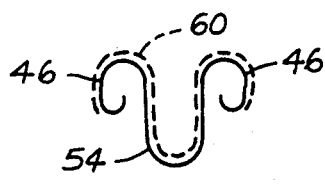
Figure 5:
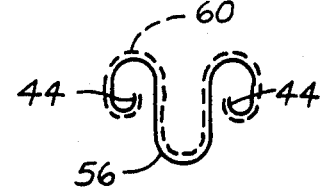
Figure 7A:
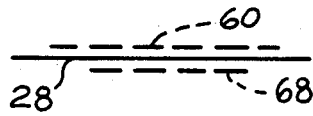
Figure 8A:
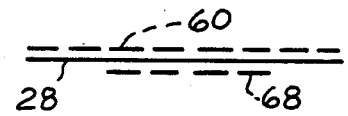

FIGS. 3A, 4A and 5A represent steps in the manufacture of the corresponding edge guards 52, 54, 56 of FIGS. 3, 4, and 5 respectively. In each of these steps, insulating material is extruded only onto the surface of the metal strip which forms the majority of the interior surface of the channel in the completed edge guard. This insulation will be designated by the reference numeral 60 in these and the subsequent drawing figures. FIGS. 3A and 3 correspond to the embodiment of edge guard 22. The plastic material 60 is extruded onto a central region of the one side of the strip so as to leave the marginal longitudinal edges of that surface of the strip free of insulation. After roll-forming, the insulation lines the interior of the channel but does not extend any appreciable extent around the distal ends of the legs.

In FIGS. 4 and 4A, the sizes of the margins which are left free of insulation are less than in FIGS. 3 and 3A whereby in the finished edge guard the insulation covers the outer portions 46 of the three thicknesses so that the insulating material is visible from the exterior at least along the distal margin of each leg.

FIGS. 5 and 5A illustrate a full covering of the one surface of the metal strip such that there is also a layer of insulating material disposed between the inner portion 44 and the corresponding leg. Thus, in this embodiment, the beads are fully covered with insulation.

Figure 6A:
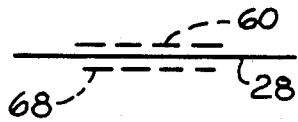
Figure 6:
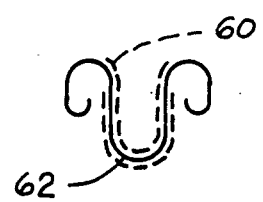
Figure 7:
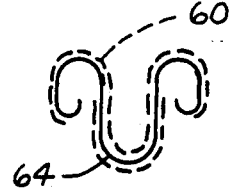
Figure 8:
Figure 10A:
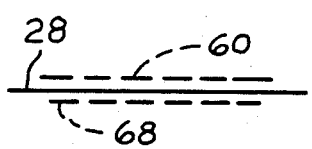
Figure 11A:
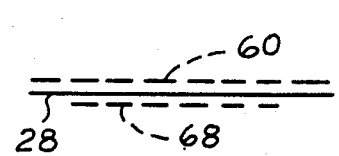

FIGS. 6, 7 and 8 are respective embodiments 62, 64, 66 in which insulation 60 is extruded onto the interior surface of the metal strip in the same respective manners as for embodiments 52, 54, 56. Additionally, each of the three respective embodiments 62, 64, 66 comprises a layer 68 of insulating material co-extruded on the side of the strip opposite layer 60. In these and subsequent embodiments, the reference numeral 68 will designate insulation applied to the surface of the strip opposite that to which insulation 60 is applied. The width of the insulation 68 is less than the width of the insulation 60; it does, however, fully cover the base and the legs on the exterior, extending from the base at least to the beads.

Therefore, the embodident 62 of FIG. 6 presents an exterior appearance which is covered by insulation except at the beads.

The FIG. 7 embodiment 64 has the exterior substantially fully covered by insulating material.

The FIG. 8 embodiment 66 is fully covered by insulating material.

Figure 9A:
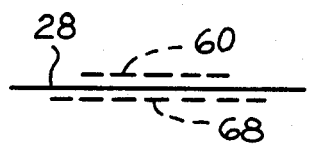
Figure 9:
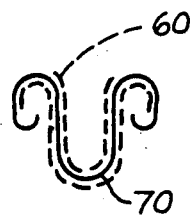
Figure 10:
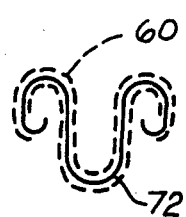
Figure 11:
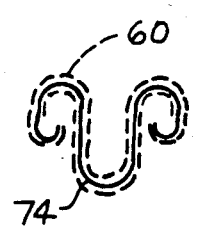

FIGS. 9, 10, and 11 depict respective embodiments 70, 72, 74 wherein the insulating material 60 is applied to the strip in the same manner as in FIGS. 3, 4, and 5 respectively, but wherein insulation 68 is co-extruded onto the opposite surface of the strip to a greater extent than it was in the embodiments of FIGS. 6, 7 and 8 respectively.

Each of the embodiments 70, 72, 74 presents an exterior appearance substantially the same as that provided by the embodiments of FIGS. 6, 7 and 8. However, due to the greater width of the insulating layer 68 the marginal longitudinally extending side edges of the insulating material on the exterior of the strip extend into the beads.

FIGS. 12, 13 and 14 are embodiments 76, 78, 80 having insulation on the interior corresponding to FIGS. 3, 4 and 5 respectively. In embodiments 76, 78, 80 the full extent of the opposite surface is covered by insulation. Hence, embodiments 76, 78, 80 present exterior appearances like those of FIGS. 9, 10, and 11 respectively. The difference in the FIGS. 12, 13 and 14 embodiments is that a further thickness of insulation is imparted to each bead.

FIGS. 15 and 16 illustrate further embodiments 82, 84 which have a different shape for the double folds. In these embodiments the outer part 86 of each fold is that portion of the metal strip which is continuous with the corresponding longitudinal edge of the strip. In embodiment 82 of FIG. 15, insulation is applied to the full extent of both surfaces of the strip, and including the longitudinal side edges, and the strip is then formed to the illustrated cross section. Hence, it presents an exterior appearance entirely of insulation.

FIG. 16 illustrates an embodiment similar to FIG. 15 but in which the insulation is selectively applied to portions of the two sides of the strip. Gaps 90, 92 are provided to control the number of thicknesses of insulating material at one of the beads.

In all embodiments, insulation is provided to line the interior in its entirety, and while this is a preferred construction and is certainly important at the force-applying points, it will be appreciated that the invention can still be practiced without full insulation on the interior.

Through the aforementioned techniques it is also possible to provide precise control of the amount of plastic material extruded, or co-extruded, onto the metal strip. Thus it is possible to control the dimensions such as in the case of the selective covering of FIG. 16 so that the desired final configuration will result. It is possible for the thickness of the insulating material to be non-uniform. It may be thicker at certain portions where desired and of a reduced thickness at other portions. For example, it may be considered desirable to taper the thickness in the vicinity of the base.

In many of the disclosed embodiments, the resultant construction at the distal end of each leg comprises three thicknesses of metal and at least two thicknesses of insulating layer wherein the two thicknesses of insulating layer are not in surface-to-surface confrontation with each other but wherein one of the two thicknesses is disposed on the distal end of the leg so as to insulate the metal of the strip from that of the door. In some of these embodiments there may be more than two thicknesses of insulating material and in this way the insulating material may be used to control the overall thickness of the distal end of each leg.

The drawing illustrates the multi-beads as being in surface-to-surface contact, in other words fully closed. In actual practice it is possible that less than full closure of the beads may be employed.

An especially desirable attribute of the invention arises because it is possible to co-extrude any desired color of plastic material onto the metal strip. By making the color the same as that of the painted door metal, color matching is obtained. Hence, in the case of the reduced thickness gap, a color-matched edge guard enhances the appearance by de-emphasizing the gap.

An edge guard is manufactured by cutting the extruded, or co-extruded, laminate to a desired length. The longitudinal ends may therefore have bare metal showing. If this is objectionable it can be concealed by applying paint, plastic, or other material to the end. A formed cap could also be fitted onto the end of the edge guard.

While a preferred embodiment of the invention has been disclosed, it will be appreciated that principles of the invention are applicable to multiple embodiments.

What is claimed is:

1. In combination with the trailing edge of a swinging metal closure on a vehicle, which trailing edge in closed position of the swinging metal closure, is separated from an adjacent panel of the vehicle by a gap, an edge guard fitting onto the trailing edge comprising a metal strip formed into a channel having an interior and an exterior and comprising a base and inner and outer legs extending from said base for applying a self-retention force against opposite sides of the trailing edge, insulating means disposed between said channel and the trailing edge at least along the force-applying points of the legs for insulating the metal of the edge guard channel from that of the trailing edge, and beads integral with and at the distal ends of said legs, at least one of said beads comprising a double thickness fold of the metal strip folded back onto the corresponding leg so that three thicknesses of metal result at the force-applying point of that leg and wherein the combined thicknesses of said strip and of said insulating means at said base are less than the thickness of said gap, and further including a non-metallic layer on the side of the strip which forms the majority of the exterior surface of the channel arranged so as to cover both said base and the leg containing the bead having double thickness fold at least to where the double thickness fold is folded back onto the leg.

2. An edge guard as set forth in claim 1 in which said non-metallic layer extends from said base far enough along the leg containing the bead having the double thickness fold so as to be disposed between said double thickness portion and the leg.

3. An edge guard as set forth in claim 1 in which said insulating means extends from the interior of the channel around the distal end of the leg containing the bead having said double thickness fold so as to cover said double thickness portion on the exterior of the channel.

4. An edge guard as set forth in claim 3 in which said non-metallic layer comprises a color matching the color of the swinging metal closure.

5. An edge guard as set forth in claim 1 in which said insulating means comprises a color matching the color of the swinging metal closure.

6. An edge guard as set forth in claim 1 in which said insulating means comprises a layer of insulating material adhered to the metal strip.

7. An edge guard as set forth in claim 1 in which said insulating means comprises a plastic material which is extruded onto the metal strip in the flat before the strip is formed into the channel.

8. An edge guard as set forth in claim 7 in which said non-metallic layer also comprises plastic material, and the plastic materials are co-extruded onto opposite surfaces of the metal strip in the flat.

9. In an ornamental and protective edge guard of generally channel-shaped cross section comprising inner and outer legs via which the edge guard is self-retaining on the edge of a sheet metal panel of a vehicle body when the edge guard is installed thereon, the edge guard comprising a metal strip formed to a generally channel-shaped cross section with the sides of the channel constituting the legs of the edge guard, and an insulating layer secured to the metal strip, the improvement comprising a bead at the distal end of one leg comprising a double thickness fold of the metal strip folded back onto the one leg so that there are three thicknesses of metal at the distal end of the one leg and said bead also comprising at least two thicknesses of said insulating layer wherein the two thicknesses of insulating layer are not in surface-to-surface confrontation with each other but wherein one of the two thicknesses of insulating layer is disposed on the distal end of the leg so as to insulate the metal of the strip from that of the sheet metal panel, and in which said insulating material is selectively disposed on both sides of the metal strip which become the major portions of the exterior and interior of the channel-shaped cross section and covers the entirety of each of said sides.

10. In an ornamental and protective edge guard of generally channel-shaped cross section comprising inner and outer legs via which the edge guard is self-retaining on the edge of a sheet metal panel of a vehicle body when the edge guard is installed thereon, the edge guard comprising a metal strip formed to a generally channel-shaped cross section with the sides of the channel constituting the legs of the edge guard, and an insulating layer secured to the metal strip, the improvement comprising a bead at the distal end of one leg comprising a double thickness fold of the metal strip folded back onto the one leg so that there are three thicknesses of metal at the distal end of the one leg and said bead also comprising at least two thicknesses of said insulating layer wherein the two thicknesses of insulating layer are not in surface-to-surface confrontation with each other but wherein one of the two thicknesses of insulating layer is disposed on the distal end of the leg so as to insulate the metal of the strip from that of the sheet metal panel, and in which insulating material is selectively applied to the metal strip such that in the finished edge guard, insulating material covers both interior and exterior of the cross section so that none of the metal on either the interior or exterior of the cross section is exposed to view.

11. In combination with the trailing edge of a swinging metal closure on a vehicle, which trailing edge in closed position of the swinging metal closure, is separated from an adjacent panel of the vehicle by a gap, an edge guard fitting onto the trailing edge comprising a metal strip formed into a channel having an interior side and an exterior side and comprising a base and inner and outer legs extending from said base for applying a self-retention force against opposite sides of the trailing edge, insulating means disposed between said channel and the trailing edge at least along the force-applying points of the legs for insulating the metal of the edge guard channel from that of the trailing edge, and beads integral with and at the distal ends of said legs, at least one of said beads comprising a double thickness fold of the metal strip folded back onto the corresponding leg so that three thicknesses of metal result at the force-applying point of that leg and wherein the combined thicknesses of said strip and of said insulating means at said base are less than the thickness of said gap, and including further insulating means disposed on the surface of said strip which forms the majority of the exterior side of said channel covering the corresponding leg at least between the double thickness fold and the base.

12. In an ornamental and protective edge guard of generally channel-shaped cross section comprising inner and outer legs via which the edge guard is self-retaining on the edge of a sheet metal panel of a vehicle body when the edge guard is installed thereon, the edge guard comprising a metal strip having opposite surfaces which respectively form the majority of the interior of the channel-shaped cross section and the majority of the exterior of the channel-shaped cross section, said strip being formed to a generally channel-shaped cross section with the sides of the channel constituting the legs of the edge guard, and an insulating layer secured to the metal strip, the improvement comprising a bead at the distal end of one leg comprising a double thickness fold of the metal strip folded back onto the one leg so that there are three thicknesses of metal at the distal end of the one leg and said bead also comprising at least two thicknesses of said insulating layer wherein the two thicknesses of insulating layer are not in surface-to-surface confrontation with each other but wherein one of the two thicknesses of insulating layer is disposed on the distal end of the leg so as to insulate the metal of the strip from that of the sheet metal panel, and in which the other thickness of insulating layer is disposed on the metal strip's surface which is opposite the surface of the metal strip on which the one thickness of insulating layer is disposed.

* * * * *